United States Patent
Zheng et al.

(10) Patent No.: US 10,207,808 B2
(45) Date of Patent: Feb. 19, 2019

(54) SEAT STRUCTURE FOR A PASSENGER SEAT AND PASSENGER SEAT

(71) Applicants: SINGAPORE TECHNOLOGIES AEROSPACE LTD, Paya Lebar (SG); TENRYU AERO COMPONENT CO., LTD., Kakamigahara, Gifu (JP)

(72) Inventors: Guo Ying Zheng, Paya Lebar (SG); Charles Fakhri Baz, Paya Lebar (SG); Teruo Sawada, Kakamigahara (JP)

(73) Assignees: ST ENGINEERING AEROSPACE LTD., Paya Lebar (SG); TENRYU AERO COMPONENT CO., LTD., Kakamigahara, Gifu (JP)

( * ) Notice: Subject to any disclaimer, the term of this patent is extended or adjusted under 35 U.S.C. 154(b) by 452 days.

(21) Appl. No.: 14/782,261

(22) PCT Filed: Apr. 5, 2013

(86) PCT No.: PCT/SG2013/000138
§ 371 (c)(1),
(2) Date: Oct. 2, 2015

(87) PCT Pub. No.: WO2014/163581
PCT Pub. Date: Oct. 9, 2014

(65) Prior Publication Data
US 2016/0031560 A1   Feb. 4, 2016

(51) Int. Cl.
*B64D 11/06* (2006.01)

(52) U.S. Cl.
CPC .................. *B64D 11/064* (2014.12)

(58) Field of Classification Search
CPC ...... B64D 11/064; B60N 2/0284; A47C 1/023
See application file for complete search history.

(56) References Cited

U.S. PATENT DOCUMENTS

| 4,515,337 A * | 5/1985 | Torras ................... B60N 2/39 248/371 |
| 5,112,109 A | 5/1992 | Takada et al. |

(Continued)

FOREIGN PATENT DOCUMENTS

| CN | 202714515 U | 2/2013 |
| EP | 1 393 655 A1 | 3/2004 |

(Continued)

OTHER PUBLICATIONS

Office action dated Nov. 8, 2016 in corresponding JP Patent Application No. 2016-506293, including English translation 10pp.

(Continued)

*Primary Examiner* — David R Dunn
*Assistant Examiner* — Tania Abraham
(74) *Attorney, Agent, or Firm* — Lewis Roca Rothgerber Christie LLP

(57) ABSTRACT

A seat structure for a passenger seat, and a passenger seat. In one embodiment, the seat structure comprises a seat pan for mounting on a frame structure of the passenger seat in a manner such that the seat pan is moveable in forward and backward directions relative to the frame independently from movement of a seat back of the passenger seat; and biasing means for biasing the seat pan in a default position.

20 Claims, 7 Drawing Sheets a)

b)

(56) References Cited

U.S. PATENT DOCUMENTS

| | | | | |
|---|---|---|---|---|
| 5,133,587 A | * | 7/1992 | Hadden, Jr. | B60N 2/4214 297/146 |
| 5,775,780 A | * | 7/1998 | Murphy | B60N 2/0825 297/216.18 |
| 6,189,971 B1 | * | 2/2001 | Witzig | A47C 1/023 297/284.1 |
| 6,193,313 B1 | | 2/2001 | Jonsson | |
| 6,641,214 B2 | * | 11/2003 | Veneruso | B60N 2/0232 297/216.15 |
| 7,780,230 B2 | * | 8/2010 | Serber | B60N 2/0745 297/216.1 |
| 8,439,435 B2 | * | 5/2013 | Gaither | B60N 2/242 297/118 |
| 8,782,835 B2 | * | 7/2014 | Pozzi | B64D 11/0647 244/118.6 |
| 8,783,771 B2 | * | 7/2014 | Oleson | B64D 11/06 297/216.15 |
| 2002/0036420 A1 | | 3/2002 | Footitt | |
| 2007/0222270 A1 | * | 9/2007 | Combest | B60N 2/4221 297/452.21 |
| 2008/0100121 A1 | * | 5/2008 | Serber | A47C 1/023 297/452.1 |
| 2010/0308167 A1 | | 12/2010 | Hawkins et al. | |

FOREIGN PATENT DOCUMENTS

| | | |
|---|---|---|
| EP | 2 243 398 A1 | 10/2010 |
| JP | 63-161905 A | 7/1988 |
| JP | 63-48200 Y2 | 12/1988 |
| JP | 2-89947 U | 7/1990 |
| JP | 10-14691 A | 1/1998 |
| JP | 2011-131699 A | 7/2011 |
| WO | WO 2010/005678 A3 | 1/2010 |

OTHER PUBLICATIONS

International Search Report for corresponding International Application No. PCT/SG2013/000138, dated Nov. 13, 2013, 5pp.

Office action dated Jan. 11, 2017 issued in corresponding Chinese Patent Application No. 201380077206.8, including Eng. translation 19pp.

* cited by examiner a)

b)

SEAT STRUCTURE FOR A PASSENGER SEAT AND PASSENGER SEAT

CROSS-REFERENCE TO RELATED APPLICATIONS

This application is a national phase application under 35 U.S.C. § 371 of International Application No. PCT/SG2013/000138, filed on Apr. 5, 2013, the disclosure of which is incorporated herein by reference in its entirety.

FIELD OF INVENTION

The present invention relates broadly to seat structure for a passenger seat and to a passenger seat.

BACKGROUND

A standard economy-type passenger seat, for example for an aircraft, comprises of a seat bottom and a reclining seat back, supported by structural frames mounted on laterally spaced-apart legs. When a larger seating angle is achieved by reclining the seatback, the personal space of the rear passenger is significantly affected.

To eliminate this reduced rear passenger space problem, fixed back shell seats have been developed to achieve a seating angle variation by only sliding the seat pan forward. However, this compromises the passenger knee space significantly, since the seat pan moves towards the front passenger seat.

To achieve a balance between the reduced rear passenger space and the reduced passenger knee space, seat pans have been developed to include an articulating feature with coupled, simultaneous movement of the seat back and the seat pan. This can allow for a larger seating angle variation to be achieved without compromising too much of either the rear passenger's personal space or the passenger's knee space. An articulating passenger seat can allow a passenger to have a more comfortable seating experience by having the seat bottom and seat back articulate together. Usually the articulating seat pan slides forward whilst the seatback reclines.

Embodiments of the present invention seek to provide at least an alternative to existing solutions for addressing the above mentioned problems.

SUMMARY

In accordance with a first aspect of the present invention, there is provided a seat structure for a passenger seat, the seat structure comprising a seat pan for mounting on a frame structure of the passenger seat in a manner such that the seat pan is moveable in forward and backward directions relative to the frame independently from movement of a seat back of the passenger seat; and biasing means for biasing the seat pan in a default position.

In accordance with a second aspect of the present invention, there is provided a seat structure for a passenger seat, the seat structure comprising a first seat pan for mounting to a frame structure of the passenger seat; a second seat pan for disposing above the first seat pan such that the second seat pan is moveable relative to the first seat pan in forward and backward directions with reference to the frame structure.

In accordance with a third aspect of the present invention, there is provided a passenger seat comprising a seat structure according to the first or second aspects.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Embodiments of the present invention relate to an ergonomically curved top seat pan that allows a passenger to slide the seat pan forward while tilting the forward end of the seat pan slightly upwards and its rear end downwards, with or without simultaneous movement of the seat back assembly, in order to preferably meet various passengers' comfort needs.

Figure 1:
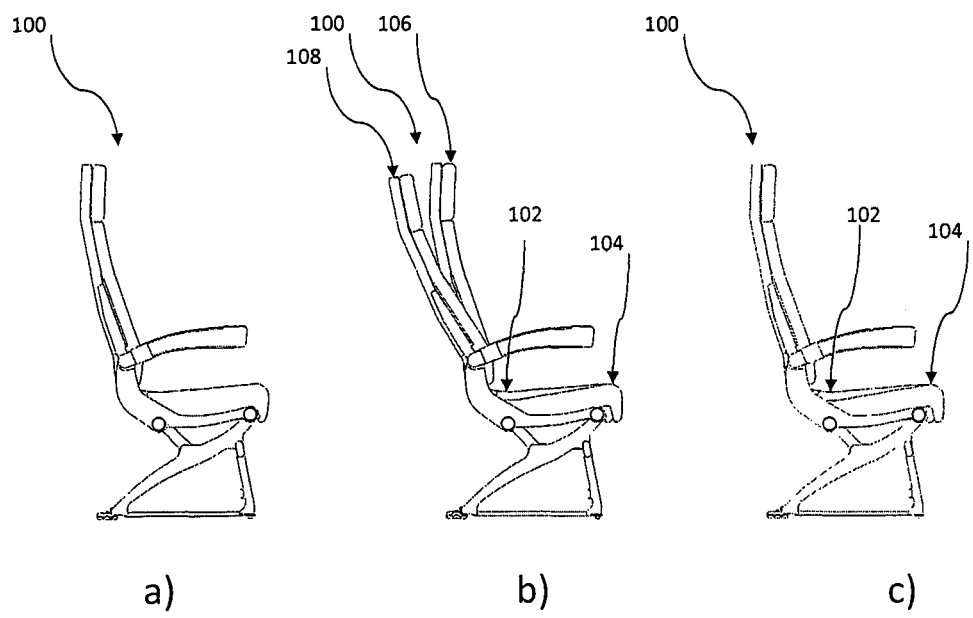
FIGS. 1a)-b) show schematic drawings illustrating simultaneous movement of the top seat pan and the seat back frame according to an example embodiment.
FIG. 1c) shows a schematic drawing illustrating independent movement of the top seat pan according to an example embodiment.

As illustrated in FIGS. 1a)-b), for simultaneous movement of the top seat pan (hidden), the seat back frame 100 is reclined according to one embodiment. The bottom of the seat back frame 100 pushes against the top seat pan in the forward direction, forcing the curved top seat pan to shift forward, tilt the forward end upwards and tilt the rear end downwards, as illustrated by the change in the seat cushion outline, indicated at numerals 102 and 104, corresponding to the seat back positions at numerals 106 and 108 respectively, in FIG. 1b).

Alternatively, as illustrated in FIG. 1c), by leaning and pushing against the upright seat frame 100 using e.g. one's hips with a predetermined amount of force, the top sliding pan shifts forward, the forward end tilts upwards and the rear end tilts downwards, as illustrated by the change in the seat cushion outline, indicated at numerals 102 and 104, but without movement of the seat back frame 100. In this embodiment, advantageously moving the top sliding pan, and thus the seat cushion, does not necessarily require the seat back frame 100 to recline, but can also be achieved if the seat back frame 100 is upright or is partially reclined.

In an example embodiment, the degree to which the passenger wishes to shift the seat depends on the amount of force applied. The rate at which the seat moves forward in relation to the rate at which the forward end of the top seat pan moves upward and the rear end of the top seat pan moves downward (and thus the seat cushion correspondingly) can be determined by the design of the seat structure including the top seat pan.

Figure 2:
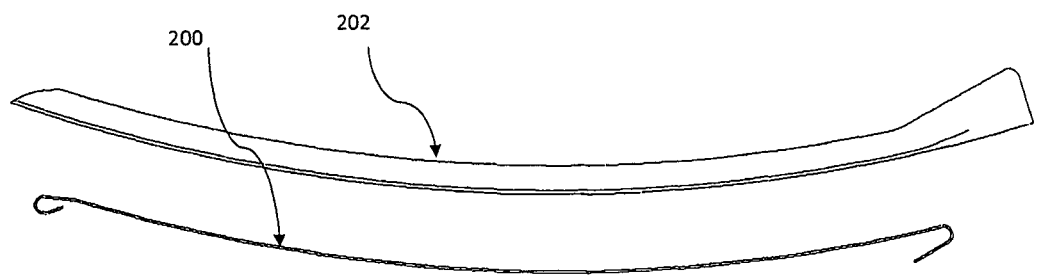
FIG. 2 shows a schematic side view drawing of top and bottom seat pans according to an example embodiment.

With reference to FIG. 2, the seat structure in an example embodiment comprises two ergonomically curved pans, a bottom pan 200 and a top sliding pan 202. Preferably, the profiles of both pans 200, 202 are similar or matched, and can be identically corresponding in a preferred embodiment. This can allow the top pan 200 to slide over the bottom pan 202 with minimal interference and can advantageously support the different seated postures of passengers, for example during long haul flights.

Figure 3:
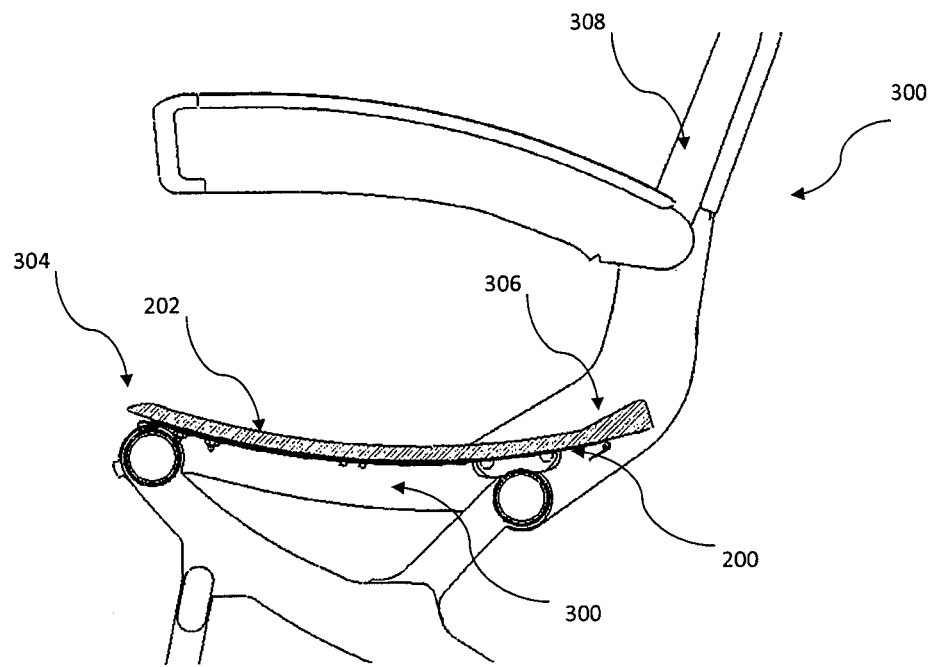
FIG. 3 shows a schematic side view drawings of part of a passenger seat comprising a seat structure according to an example embodiment.

With reference to FIG. 3, the bottom pan 200 is rigidly connected to the primary frame structure 300 of the seat 302 to advantageously form a shear resistant diaphragm so as to enhance the seat structure's 300 integrity. The bottom pan 200 can be fabricated for individual seats or can span the width of a multi-seat configuration, e.g. a triple seat configuration. The individual top pans 202 are supported by the bottom pan 200. The interface between the top pan 202 and the bottom pan 200 can include, but is not limited to, rollers and slide guides. The rollers can initiate the rolling motion and the sliders can provide a smooth sliding surface in example embodiments. The guiding of the top pan 202 by the bottom pan 200 can advantageously allow the top pan 202 to shift forward whilst raising the forward end 304 upwards and lowering the rear end 306 of the top seat pan 202 downwards, due to the curved profile in the example embodiment. The movement of the top seat pan 202 can be via an articulating seat back 308 or by active movement of the passenger body, such as slouching forward against an upright or partially reclined seat back 308. Advantageously, example embodiments can thus improve the comfort of the passenger by providing the passenger a wider selection of seating angles and postures. In a passenger seat incorporating the seat structure 300 of this example embodiment, a seat cushion (not shown) is mounted on the top seat pan 202, such that the seat cushion moves correspondingly to the movement of the top seat pan 202.

Figure 4:
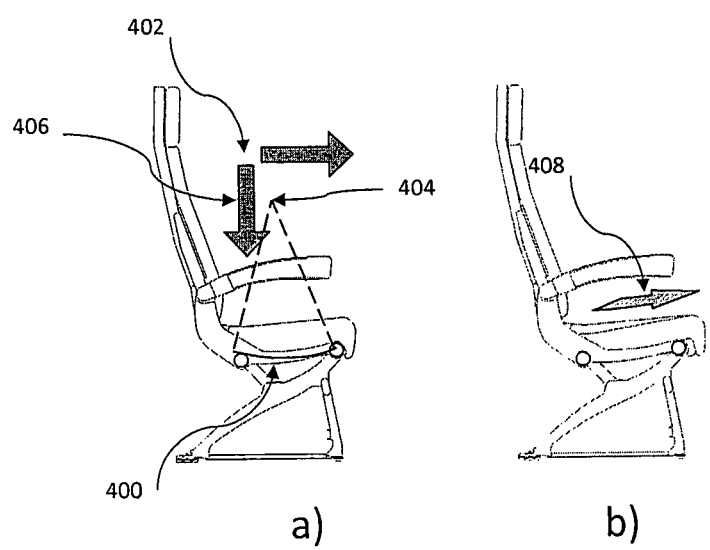
FIGS. 4a) and b) show schematic drawings illustrating movement of a seat structure according to an example embodiment.

With reference to FIGS. 4a) and b), the curvature 400 design of the top and bottom seat pans in an example embodiment can advantageously not only provide a comfortable seating experience, but can also provide energy attenuation during e.g. a hard landing or crash. When such an incident occurs, passengers can be subjected to vertical (downwards) and horizontal (forward) loads.

In an example embodiment, the curvature 400 is designed such that the centre of gravity, indicated at numeral 402, of most passengers in the seated position is rearward of the centre of curvature, indicated at numeral 404. Therefore, a downward load 406 can force the top seat pan 202 (FIG. 3) to slide forward, redirecting some of the energy away from compressing e.g. the passenger's spine. Preferably, some energy can be absorbed due to a biasing structure coupled to the top seat pan, such as one or more springs. Advantageously, the forward motion 405 of the top seat pan during such an emergency can also be beneficial in reducing a forward distance traveled by the passenger's head relative to the passenger's body during rapid deceleration.

Figure 5:
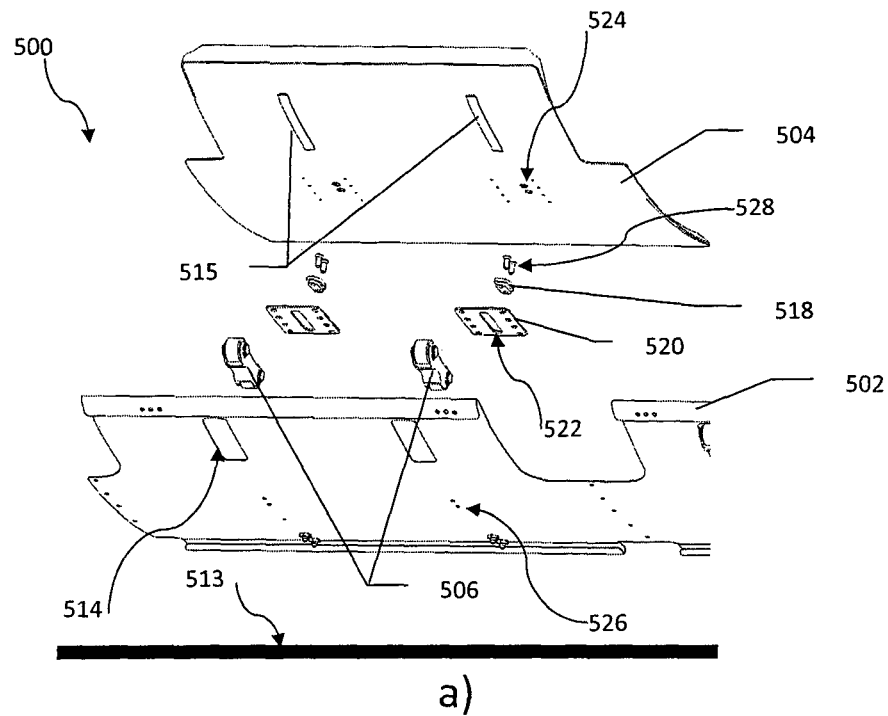
FIGS. 5a) and b) show schematic exploded bottom and top views respectively of components of a seat structure according to an example embodiment.
Figure 5:
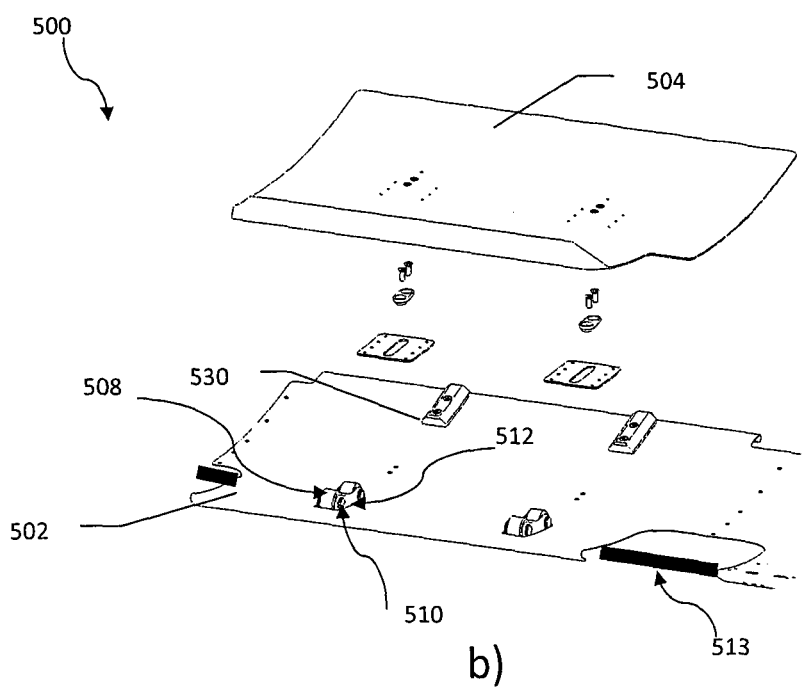

FIGS. 5a) and b) show schematic exploded bottom and top views respectively of the components of a seat structure 500 according to an example embodiment. The bottom pan 502 in this example is fabricated to span the width of a multi-seat configuration, e.g. a triple seat configuration. Each top pan 504 is supported by the bottom pan 502. The interface between the top pan 504 and the bottom pan 502 includes rollers 506 mounted in this embodiment on the bottom pan 502. The rollers 506 each comprise a pair of wheels e.g. 508 on parallel axles e.g. 510 supported within a roller frame e.g. 512. The roller frame e.g. 512 is received in corresponding slots e.g. 514 formed in the bottom pan 502. In this example embodiment, the rollers e.g. 506 are supported on one or more beams 513 connected to the seat frame (not shown). The slots e.g. 514 arrest each roller 506 against lateral movement. The walls of the roller frame e.g. 512 protrude the wheels e.g. 508 such that the wheels can freely turn when the roller is received/supported in the slots e.g. 514. In an alternative embodiment, the rollers 506 can be supported by the bottom pan 502.

In this embodiment, strips e.g. 515, made of nylon in one example, are secured on the top pan 504, for example by gluing, to provide matching roller surfaces on which the wheels e.g. 508 engage the top pan 504. Slider blocks e.g. 518 are provided for mounting on the bottom pan 502. Retainer frames e.g. 520 are configured such that each slider block e.g. 518 is received with a smaller end thereof extending through the slot e.g. 522 in each retainer frame e.g. 520, and with a top lip of the slider block e.g. 518 engaging the top rim of the slot e.g. 522. The retainer frames e.g. 520 are mounted to the top pan 504 using for example nuts and bolts, with the slider blocks e.g. 518 received in the slots e.g. 522. Access holes e.g. 524 are provided in the top pan 504 for facilitating fastening of the slider blocks e.g. 518 on the bottom pan 502, during assembly, into fastening holes e.g. 526 formed in the bottom pan 502 for bolts e.g. 528 in this example embodiment. Slide guides e.g. 530 are mounted on the bottom pan 502 and are received in tracks (not shown) formed on the top pan 504 when assembled on top of the bottom pan 502, for guiding movement of the top pan 504 relative to the bottom pan 502.

The components and their installation as described for example embodiments preferably allow easy replacement during maintenance checks, and the design of the components is such that they can be fabricated with ease, as will be appreciated by a person skilled in the art. This advantageously means that while the components may experience wear and tear after prolonged usage, as with all moving components, they can be readily and cost effectively replaced during maintenance checks if required, and/or according to a replacement schedule.

Figure 6:
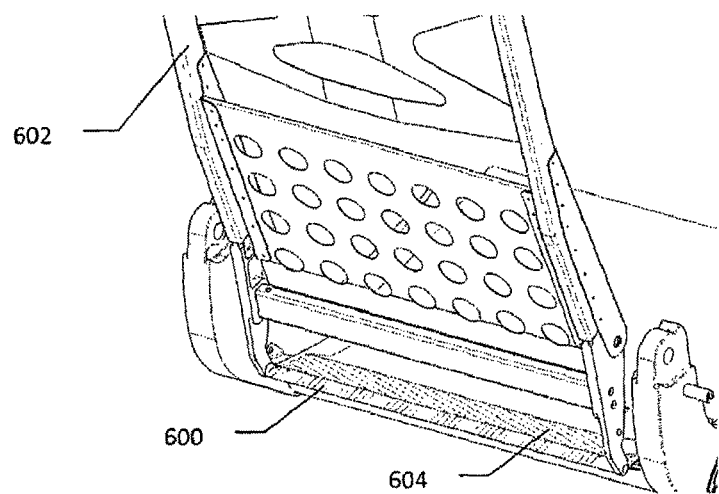
FIGS. 6a) and b) show a schematic isometric back view and a side view of part of a passenger seat comprising a seat structure according to an example embodiment.
Figure 6:
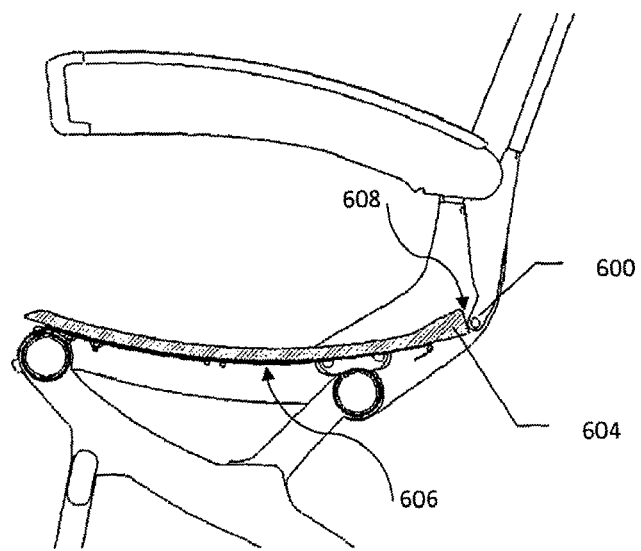

As shown in FIGS. 6a) and b), a rod 600 is provided in an example embodiment at the bottom of the back frame structure 602, which rod 600 is placed such that when the seatback reclines, the rod 602 advantageously pushes against the rear of the top seat pan 604. Thus, a force can be exerted by the seat back of the passenger seat for movement of the top seat pan 604 relative to the bottom seat pan 606. In this example embodiment, the top seat pan 604 comprises a substantially flat surface 608 disposed for receiving the force substantially perpendicularly to the surface 608. In an alternative embodiment, the rear surface may not be substantially flat, but may comprise a recess for receiving the rod 600 therein, providing a joint structure between the top pan and the back seat. In example embodiments, the interface between the top seat pan and the seat back is preferably designed such that the contact point/area is close to, or is substantially at, a stiffness center of the top seat pan, to minimize a moment applied for improving durability and smoothness of movement. As this coordinated movement is achieved by contact in this example embodiment, when the passenger retracts the seatback to the upright position, the top seat pan 604 will advantageously not necessarily follow unless the passenger relieves some weight off the top seat pan 604.

In an example embodiment, returning the top seat pan to the default position in preparation for TTOL (Taxing, Take Off and Landing), can be facilitated by installing a biasing member such as a spring or springs, or spring structure(s) between the top and bottom seat pans, or between the top seat pan and the seat frame. In the following, one non-limiting example will be described.

The top seat pan in the example embodiment can be moved by:
1) Reclining the seatback with the interface, e.g. a rod at bottom of the seatback, pushing the top seat pan whilst compressing the spring or springs. Forward movement of the top seat pan within the designed envelop can be controlled by the amount the seatback is reclined by.
2) Applying a force to the top seat pan. Forward movement of the top seat pan within the designed envelop can be controlled by the amount of force applied by e.g. the passenger to compress the spring or springs.
3) Spring expansion (relief). Rearward movement to the default position or to the point where the top seat pan is in contact with the seat back occurs when the force applied on the seat pan by e.g. the passenger is removed, allowing the spring or springs to expand from the compressed state and return to the acquiescent state or shape.

These mechanisms in an example embodiment advantageously allow independent movement of the top seat pan from the seatback when it is not reclined fully, as well as allowing automatic restoration of the seat pan when no force is acting on the top pan. The flexibility of selecting the seating position can preferably provide comfort to a large population passenger profile.

In addition to retracting the top seat pan back to its default position once e.g. the passenger's applied force is removed, the biasing means such as the spring or springs can advantageously also act as an energy absorption system during instances of rapid deceleration in the forward direction, such as the 16 g forward loading condition, via compression, which can enhance the survivability of the passenger. Furthermore, the energy absorbing springs can help reduce the forward distance traveled by the passenger's head in such an event. This is believed to be because preferably the head moves with the body against the spring or springs first, with the forward inertia being partially absorbed by the spring or springs. This can reduce the amount of travelling distance by the body and head as a whole, before the head may move further relative to the body due to any remaining energy.

Figure 7:
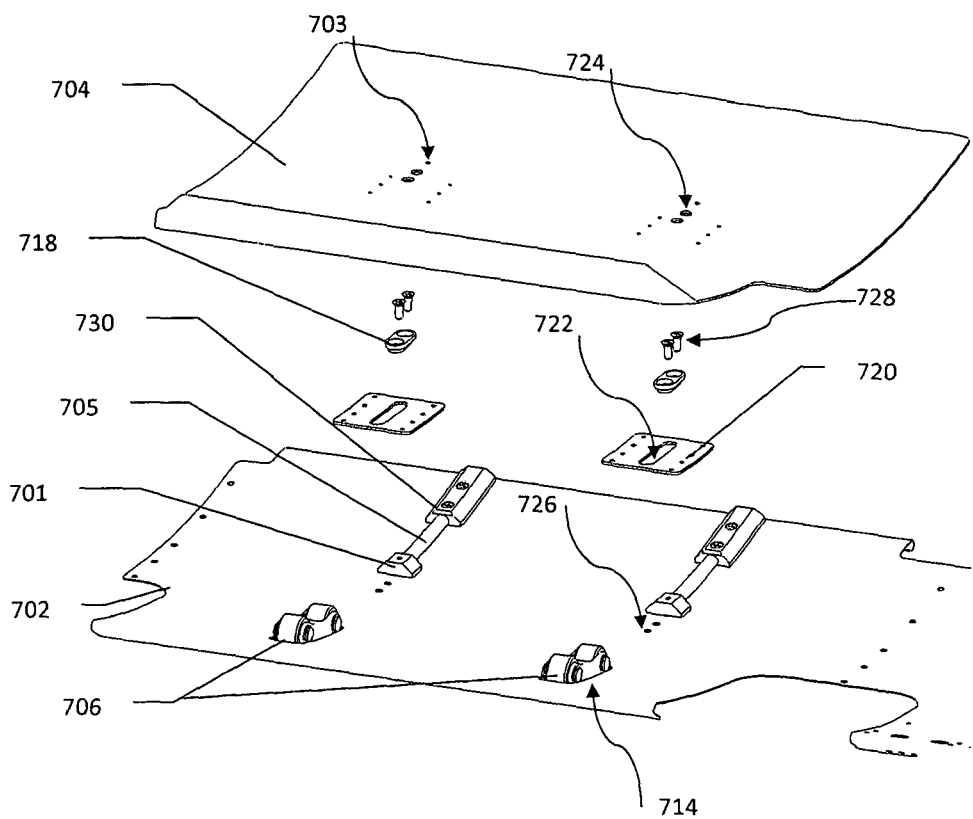
FIG. 7 shows a schematic exploded top view of components of a seat structure according to an example embodiment.

With reference to FIG. 7, in one example embodiment, spring blocks e.g. 701 are attached to the underside of the top seat pan 704 using e.g. screws (not shown) through holes e.g. 703 in the top seat pan 704. The spring blocks e.g. 701 engage and compress springs e.g. 705 against the sliding movement of the top seat pan 704 relative to the bottom seat pan 702 while moving the top seat pan 704 forward. The springs e.g. 705 in turn store energy and can return the top seat pan 704 to its default position once the force on the seat pan 704 is relieved by e.g. the passenger.

The bottom pan 702 in this example is fabricated to span the width of a multi-seat configuration, e.g. a triple seat configuration. Each top pan 704 is supported by the bottom pan 702. The interface between the top pan 704 and the bottom pan 702 includes rollers 706 supported on one or more beams (not shown) connected to the seat frame (not shown). The slots e.g. 714 arrest each roller 706 against lateral movement. Slider blocks e.g. 718 are provided for mounting on the bottom pan 702. Retainer frames e.g. 720 are configured such that each slider block e.g. 718 is received with a smaller end thereof extending through the slot e.g. 722 in each retainer frame e.g. 720, and with a top lip of the slider block e.g. 718 engaging the top rim of the slot e.g. 722. The retainer frames e.g. 720 are mounted to the top pan 704 using for example nuts and bolts with the slider blocks e.g. 718 received in the slots e.g. 722. Access holes e.g. 724 are provided in the top pan 704 for facilitating fastening of the slider blocks e.g. 718 on the bottom pan 702, during assembly, into fastening holes e.g. 726 formed in the bottom pan 702 for bolts e.g. 728 in this example embodiment. Slide guides e.g. 730 are mounted on the bottom pan 702 and are received in tracks (not shown) formed on the top pan 704 when assembled on top of the bottom pan 702, for guiding movement of the top pan 704 relative to the bottom pan 702.

Figure 8:
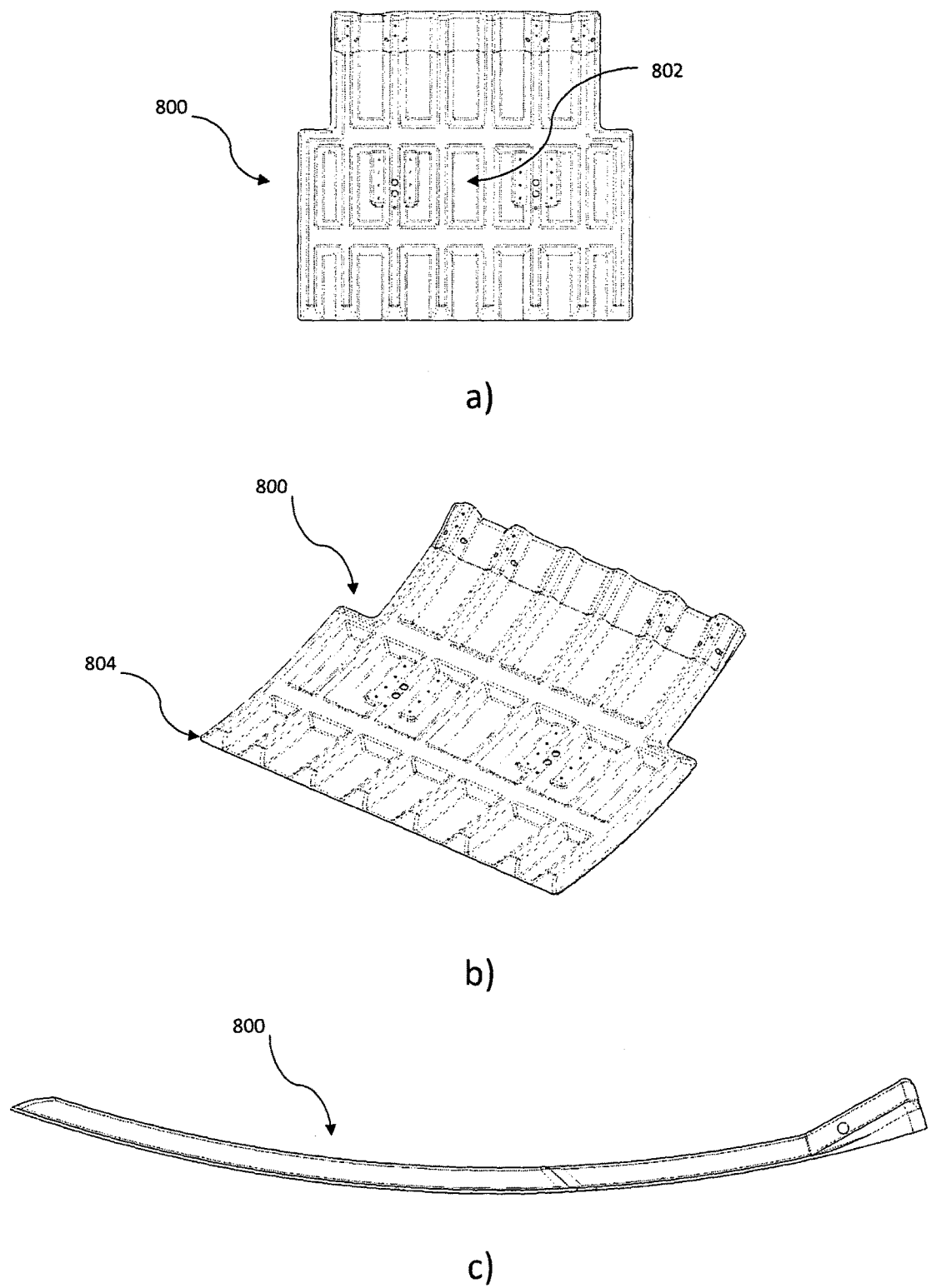
FIGS. 8a)-c) show schematic top, isometric top and side views respectively of components of a seat structure according to an example embodiment.

FIGS. 8a) to c) show schematic top, isometric and side views of a top seat pan 800 according to an example embodiment. In this example embodiment, the top seat pan's 800 cross-section is designed such as to advantageously provide a good contact surface with part of the seatback structure, e.g. a rod, and to allow the sub-components to be placed within the confines of the top seat pan's 800 rigid structure, hidden from plain sight with enough clearance for smooth operation. The top seat pan 800 can be made, for example, from metal, plastic or composite materials and when combined with the corrugated cross-section, the top seat pan 800 is advantageously able to absorb energy during emergency conditions such as 14 G downwards loading by e.g. deformation of the corrugated cross-section under compression, therefore preferably reducing the loads experienced by the passenger and enhancing survivability. The top seat pan 800 may be made from a transparent material such as a transparent plastic, which can advantageously aid in the inspection, assembly, as well as maintenance processes.

The nature of the corrugation of the top seat pan 800 can vary in different embodiments, for example the number, shape and dimensions of pockets e.g. 802 can be varied, to enhance the rigidity as well as the energy attenuation of the seat pan 800. In the example embodiment, the pockets e.g. 802 advantageously serve several purposes in the design of the seat pan 800:
1) Structural re-enforcements of the sheet 804 of material to provide/retain structural integrity.
2) Housing for sub-components of the seat structure 800
3) Absorption of energy during emergency conditions such as 14 G downwards loading.

Figure 9:
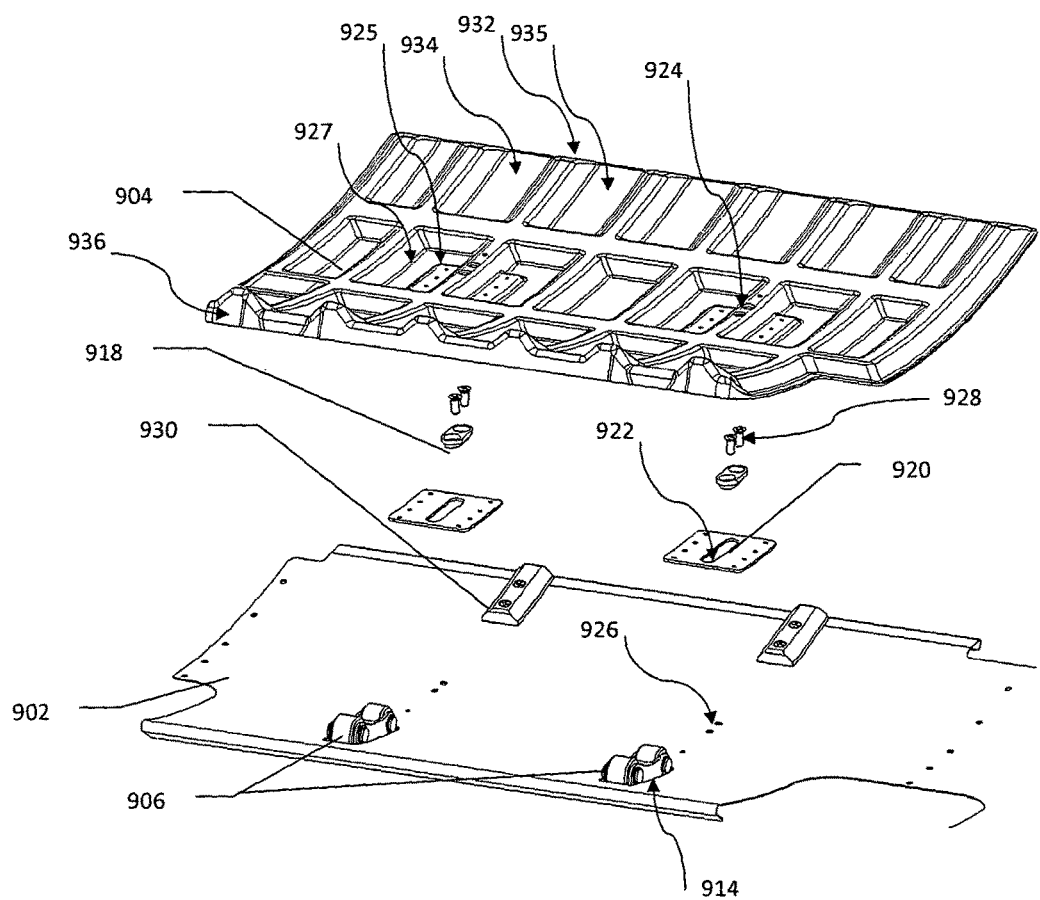
FIG. 9 shows a schematic exploded top view of components of a seat structure according to an example embodiment.

With reference to FIG. 9, in one example embodiment the bottom pan 902 is fabricated to span the width of a multi-seat configuration, e.g. a triple seat configuration. Each top pan 904 is supported by the bottom pan 902. The interface between the top pan 904 and the bottom pan 902 includes rollers 906 supported on one or more beams (not shown) connected to the seat frame (not shown). The slots e.g. 914 arrest each roller 506 against lateral movement. Slider blocks e.g. 918 are provided for mounting on the bottom pan 902. Retainer frames e.g. 920 are configured such that each slider block e.g. 918 is received with a smaller end thereof extending through the slot e.g. 922 in each retainer frame e.g. 920, and with a top lip of the slider block e.g. 918 engaging the top rim of the slot e.g. 922. The retainer frames e.g. 920 are mounted to the top pan 904 using for example nuts and bolts with the slider blocks e.g. 918 received in the slots e.g. 922. Access holes e.g. 924 are provided in the top pan 904 for facilitating fastening of the slider blocks e.g. 918 on the bottom pan 902, during assembly, into fastening holes e.g. 926 formed in the bottom pan 902 for bolts e.g. 928 in this example embodiment. Recesses e.g. 925 are formed in some of the pockets e.g. 927 to receive the retainer frames e.g. 920.

Slide guides e.g. 930 are mounted on the bottom pan 902 and are received in tracks e.g. 932 formed on the top pan 904 extending between pockets e.g. 934, 935 of the corrugation pattern, for guiding movement of the top pan 904 relative to the bottom pan 902 when assembled.

In this embodiment, an interface 936 to the back seat structure for pushing the top pan 904 during reclining of the seat back extends across the corrugated cross section design of the top pan 904. The interface 936 advantageously receives the push force in such a way as to avoid bending at the interface 936, since the contact point/area is close to, or substantially at, a stiffness center of the top seat pan 904, to advantageously minimize a moment applied for improved durability and smoothness of movement. For example, in this embodiment the stiffness center would be located in the upper half of the interface 936.

The interface between seatback and top seat pan 904 can be designed in other ways in different embodiments, with the translation of the top seat pan 904 preferably being through contact, for achieving independent movement of the top pan 904. In different embodiments, for example varying contact areas, location, patterns etc. may be used.

In one embodiment, a seat structure for a passenger seat is provided, the seat structure comprising a seat pan for mounting on a frame structure of the passenger seat in a manner such that the seat pan is moveable in forward and backward directions relative to the frame independently from movement of a seat back of the passenger seat; and biasing means for biasing the seat pan in a default position. In the default position, the seat pan can be substantially in a maximum backward position. The seat pan can be movable on a curved trajectory along the forward and backward directions. The curved trajectory can comprise first and second opposing ends and an intermediate portion between the first and second ends, the intermediate portion being at a vertically lower position compared to the first and second ends.

In one embodiment, the seat pan can be curved along a depth thereof. The seat pan can comprise one or more rollers for engaging one or more a track strips mounted to the frame structure of the passenger seat.

In one embodiment, the seat pan can comprise one or more track strips for engaging one or more rollers mounted to the frame structure of the passenger seat.

In one embodiment, the seat pan can comprise one or more slider elements for being received in corresponding one or more guiding tracks mounted to the frame structure of the passenger seat.

In one embodiment, the seat pan can comprise one or more guiding tracks for receiving one or more corresponding slider elements mounted to the frame structure of the passenger seat.

In one embodiment, the seat pan can be corrugated. The seat pan can be corrugated along one or more directions thereof.

In one embodiment, the seat structure can further comprise one or more retaining structures for limiting the movement of the seat pan. Each restraining structure can comprise a first element on the seat pan for abutting a second element mounted to the frame structure of the passenger seat. The biasing means can comprise one or more biasing elements configured to about the respective first elements on the seat pan.

In one embodiment, the seat pan can be further configured for receiving a force exerted by a seat back of the passenger seat for movement of the seat pan relative to the frame structure of the passenger seat. The seat pan can be configured to receive a pushing force exerted by the seat back. The seat pan can be configured to receive the pushing force as a result of reclining of the seat back. The seat pan can comprise an interface structure disposed for receiving the force. The interface structure can comprise a substantially flat surface for receiving the force. The interface structure can comprise a surface with a recess formed therein for receiving the force. The interface structure can be disposed at one end of the seat pan and extending substantially across a corrugation pattern of the seat pan.

In one embodiment, the seat pan can be configured to be mounted to the frame structure by being disposed above and supported by a further seat pan mounted to the frame structure.

In one embodiment, the biasing means can comprise one or more springs.

In one embodiment, a seat structure for a passenger seat is provided, the seat structure comprising a first seat pan for mounting to a frame structure of the passenger seat; a second seat pan for disposing above the first seat pan such that the second seat pan is moveable relative to the first seat pan in forward and backward directions with reference to the frame structure. The second seat pan can be moveable relative to the first seat pan independent from movement of a seat back of the passenger seat. The first seat pan or a guiding structure of the seat structure can be configured for guiding the movement of the second seat pan on a curved trajectory along the forward and backward directions. The guiding structure can comprise a seat beam for the frame structure or an interface structure for mounting to the frame structure. The curved trajectory can comprise first and second opposing ends and an intermediate portion between the first and second ends, the intermediate portion being at a vertically lower position compared to the first and second ends.

In one embodiment, the first and second seat pans can have substantially matching curvatures along respective depths thereof. The seat structure can further comprise a roller mechanism or a sliding mechanism for the movement of the second seat pan relative to the first seat pan. One of the first and second seat pans can comprise one or more slider elements for being received in corresponding one or more guiding tracks formed in the other.

In one embodiment, the seat structure can further comprise biasing means for biasing the first and second seat pans in a first relative position to each other. The biasing means can comprise one or more springs. In the first relative position, the second seat pan can be substantially at a maximum backward position.

In one embodiment, the second seat pan can be corrugated. The second seat pan can be corrugated along one or more directions thereof. The first seat pan can have substantially parallel curved top and bottom surfaces.

In one embodiment, the seat structure can further comprise one or more retaining structures for limiting the relative movement of the first and second seat pans to a maximum displacement. Each restraining structure can comprise a first element on one of the first and second seat pans and a second element on the other, for abutting each other at the maximum displacement.

On one embodiment, the second seat pan can be further configured for receiving a force exerted by a seat back of the passenger seat for movement of the second seat pan relative to the first seat pan. The second seat pan can be configured to receive a pushing force exerted by the seat back. The second seat pan can be configured to receive the pushing force as a result of reclining of the seat back. The second seat pan can comprise a flat surface disposed for receiving the force. The second seat pan can comprise a surface with a recess formed therein for receiving the force. The flat surface or the surface with the recess can be disposed at one end of the second seat pan and extending substantially across a corrugation pattern of the second seat pan.

In one embodiment, the seat structure can comprise a plurality of second seat pans and a common first seat pan.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

For example, the retainer can be designed in other ways that sliding is allowed while sufficient holding strength has been provisioned through the design. Examples include varying locations, mechanical fastening methods. Preferably, the retainer design provides for securing the top seat pan in 16 g as well as 14 g situations.

As another example, the seat pans can be designed with different shapes, different material as well as different processes to achieve desired moving patterns. Also, the biasing means can be provided differently, including using springs selected and installed with different stiffness, and/or at different locations to best suit an overall effect in accordance with the seat design in example embodiments.

The invention claimed is:

1. A seat structure for a passenger seat, the seat structure comprising:
   a first seat pan for mounting to a frame structure of the passenger seat; and
   a second seat pan for disposing-above the first seat pan such that the second seat pan is moveable relative to the first seat pan in forward and backward directions with reference to the frame structure, the second seat pan being rigid,
   wherein the first seat pan or a guiding structure of the seat structure is configured for guiding a movement of the second seat pan on a curved trajectory along the forward and backward directions, and
   wherein the first and second seat pans have substantially matching curvatures along respective depths thereof, the curvatures extending across an entire width of the first and second pans, respectively.

2. The seat structure as claimed in claim 1, wherein the second seat pan is moveable relative to the first seat pan independent from or coordinated with movement of a seat back of the passenger seat.

3. The seat structure as claimed in claim 1, wherein the curved trajectory comprises first and second opposing ends and an intermediate portion between the first and second ends, the intermediate portion being at a vertically lower position compared to the first and second ends.

4. The seat structure as claimed in claim 1, further comprising a roller mechanism or a sliding mechanism for the movement of the second seat pan relative to the first seat pan.

5. The seat structure as claimed in claim 1, wherein one of the first and second seat pans comprises one or more slider blocks for being received in corresponding one or more retainer frames formed in the other.

6. The seat structure as claimed in claim 1, further comprising biasing means for biasing the first and second seat pans in a first relative position to each other.

7. The seat structure as claimed in claim 6, wherein the biasing means comprises one or more springs.

8. The seat structure as claimed in claim 7, wherein in the first relative position, the second seat pan is substantially at a maximum backward position.

9. The seat structure as claimed in claim 1, wherein the second seat pan is corrugated.

10. The seat structure as claimed in claim 9, wherein the second seat pan is corrugated along one or more directions thereof.

11. The seat structure as claimed in claim 9, wherein the first seat pan has substantially parallel curved top and bottom surfaces.

12. The seat structure as claimed in claim 1, further comprising one or more retaining structures for limiting the relative movement of the first and second seat pans to a maximum displacement.

13. The seat structure as claimed in claim 12, wherein each restraining structure comprises a first element on one of the first and second seat pans and a second element on the other, for abutting each other at the maximum displacement.

14. The seat structure as claimed in claim 1, wherein the second seat pan is further configured for receiving a force exerted by a seat back of the passenger seat for movement of the second seat pan relative to the first seat pan.

15. The seat structure as claimed in claim 14, wherein the force is a pushing force, wherein the second seat pan is configured to receive the pushing force exerted by the seat back, wherein the second seat pan may be configured to receive the pushing force as a result of reclining of the seat back.

16. The seat structure as claimed in claim 14, wherein the second seat pan comprises a flat surface disposed for receiving the force, or wherein the second seat pan comprises a surface with a recess formed therein for receiving the force, wherein the flat surface or the surface with the recess may be disposed at one end of the second seat pan and extending substantially across a corrugation pattern of the second seat pan.

17. The seat structure as claimed in claim 1, comprising a plurality of second seat pans and a common first seat pan.

18. A passenger seat comprising a seat structure as claimed in claim 1.

19. A seat structure for a passenger seat, the seat structure comprising:
   a first seat pan for mounting to a frame structure of the passenger seat; and
   a second seat pan for disposing above the first seat pan such that the second seat pan is moveable relative to the first seat pan in forward and backward directions with reference to the frame structure, the second seat pan being rigid,
   wherein the first seat pan or a guiding structure of the seat structure is configured for guiding a movement of the second seat pan on a curved trajectory along the forward and backward directions; and
   wherein the second seat pan is further configured for receiving a force exerted by a seat back of the passenger seat for movement of the second seat pan relative to the first seat pan.

20. The seat structure as claimed in claim 19, wherein the force is a pushing force, wherein the second seat pan comprises a flat surface disposed for receiving the pushing force, or wherein the second seat pan comprises a surface with a recess formed therein for receiving the pushing force, wherein the flat surface or the surface with the recess may be disposed at one end of the second seat pan and extending substantially across a corrugation pattern of the second seat pan.

* * * * *